(12) United States Patent
Sriram et al.

(10) Patent No.: US 7,072,397 B2
(45) Date of Patent: *Jul. 4, 2006

(54) OPTIMAL ENCODING OF MOTION COMPENSATED VIDEO

(75) Inventors: Parthasarathy Sriram, San Jose, CA (US); Subramania Sudharsanan, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/156,992

(22) Filed: May 29, 2002

(65) Prior Publication Data
US 2003/0063667 A1    Apr. 3, 2003

Related U.S. Application Data

(63) Continuation of application No. 09/238,878, filed on Jan. 27, 1999, now Pat. No. 6,414,992.

(51) Int. Cl.
*H04N 7/12* (2006.01)
(52) U.S. Cl. .......................... 375/240.13; 375/240.16; 375/240.29
(58) Field of Classification Search ........... 375/240.02, 375/240.03, 240.12, 240.13, 240.16, 240.2, 375/240.24, 240.26, 240.29; 382/236, 238, 382/239, 248, 250; 348/407.1, 413.1, 416.1, 348/425.2; 358/426.09, 426.14; 386/111
See application file for complete search history.

(56) References Cited
U.S. PATENT DOCUMENTS
5,883,979 A * 3/1999 Beretta et al. .............. 382/251

6,043,844 A * 3/2000 Bist et al. .............. 375/240.24

OTHER PUBLICATIONS

Yuen-Wen Lee, Rabab Ward, Faousi Kossentini, Mark J. T. Smith. "Very Low Rate DCT-Based Video Coding Using Dynamic VQ," *Proceedings Of The International Conference On Image Processing (ICIP)*, New York, IEEE, 1996, pp. 669-672.

Wilson C. Chung, Faouzi Kossentini, and Mark J. T. Smith. "An Efficient Motion Estimation Technique Based On A Rate-Distortion Criterion," *1996 IEEE International Conference On Acoustics, Speech, And Signal Processing Conference Proceedings*, Atlanta, GA, USA, 7-10 M, pp. 1926-1929, vol. 4.

(Continued)

*Primary Examiner*—Vu Le
(74) *Attorney, Agent, or Firm*—Zagorin O'Brien Graham LLP (57) ABSTRACT

The present invention involves a system and method for performing motion estimation. For each candidate motion vector, encoding distortion is determined between a macroblock and a reconstructed macroblock by determining discrete cosine transform coefficients of the macroblock and quantizing the discrete cosine transform coefficients. An estimate unit determines the length of the bit stream required to encode the quantized discrete cosine transform coefficients along with the mode information bits including mode and motion vector information. The reconstructed macroblock is determined based on the quantized discrete cosine transform coefficients. A bit-rate term based on the length of the bit-rate stream is determined and included in the encoding distortion. The candidate motion vector which minimizes the encoding distortion of the macroblock is chosen to be the motion vector for the macroblock.

38 Claims, 3 Drawing Sheets

OTHER PUBLICATIONS

T.H. Kewh, F. Eryurtlu, A.M. Kondoz. "Closed-Loop Motion Compensation For Video Coding Standards" *IEE Proceedings: Vision, Image and Signal Processing*, GB, Institution of Electrical Engineers, vol. 144, No. 4, Aug. 1, 1997, pp. 227-232.

Guido M. Schuster, Aggelos K. Katsaggelos. "A Theory For the Optimal Bit Allocation Between Displacement Vector Field And Displaced Frame Difference," *IEEE Journal On Selected Areas in Communications*, vol. 15, No. 9, pp. 1739-1751, Dec. 1997.

Faouzi Kossentini, Yuen-Wen Lee, Mark J. T. Smith and Rabab K. Ward. "Predictive RD Optimized Motion Estimation For Very Low Bit-Rate Video Coding," *IEEE Journal On Selected Areas in Communications*, New York, vol. 15, No. 9, Dec. 1, 1997, pp. 1752-1762.

Stephani Y. Hu, Michael C. Chen, and Alan N. Willson, Jr. "A Fast Rate-Distortion Optimization Algorithm For Motion-Compensated Video Coding," *IEEE International Symposium On Circuits And Systems*, US, New York, NY: IEEE, 1997, pp. 1349-1352.

Dzung T. Hoang, Philip M. Long, and Jeffrey Scott Vitter. "Efficient Cost Measures For Motion Estimation At Low Bit Rates," *IEEE Transactions On Circuits and Systems For Video Technology*, US, IEEE Inc. New York, vol. 8, No. 4, Aug. 1, 1998, pp. 488-500.

Yuen-Wen Lee, Faouzi Kossentini, Rabab Ward, Mark Smith. "Towards MPEG4: An Improved H.263-Based Video Coder," *Signal Processing: Imaging Communication*, NL, Elsevier Science Publishers, Amsterdam, vol. 10, No. 1-3, pp. 143-158, Jul. 1, 1997.

Parthasarathy Sriram and Subramania Sudharsanan. "Entropy Constrained Motion Estimation: Algorithm and Implementation"; *Multimedia Hardware Architectures 1998*, San Jose, CA, USA, Jan. 29-30, 1998, vol. 3311, pp. 99-107.

Jiandong Shen and Wai-Uip Chan. "A Non-Parametric Method For Fast Joint Rate-Distortion Optimization Of Motion Estimation And DFD Coding"; *Proceedings 1998 International Conference On Image Processing, Proceedings Of IPCIP '98 International Conference On Image Processing*, Chicago, IL, Oct. 4-7, 1998, pp. 915-919 vol. 3.

Pattabiraman Subramanian, Dariusz Blasiak, Jiandong Shen and Wai-Yip Chan. "Encoder Optimization In An Extended H.263 Framework"; *Conference Record Of The Thirty-First Asilomar Conference On Signals, Systems And Computers*, Pacific Grove, CA, USA, pp. 209-213 vol. 1.

\* cited by examiner

OPTIMAL ENCODING OF MOTION COMPENSATED VIDEO

This application is a continuation of patent application Ser. No. 09/238,878 filed Jan. 27, 1999 now U.S. Pat. No. 6,414,992 and entitled "Optimal Encoding of Motion Compensated Video," having Parthasarathy Sriram and Subramania Sudharsanan as inventors. This application is assigned to Sun Microsystems, Inc., the assignee of the present invention, and is hereby incorporated by reference, in its entirety and for all purposes.

BACKGROUND OF THE INVENTION

1. Field of the Invention

This invention relates to the field of signal processing, and more particularly relates to a method and apparatus to optimize motion video encoding using both distortion and bit-rate constraints.

2. Description of the Related Art

To represent a picture image digitally, the image area is described as an array of pixels. A digital number describes the color, luminance and chrominance of each pixel. Pixel color information consists of three digital values: one digital value for red, one for green, and one for blue. Thus, a fairly large volume of data is required to describe one pixel. Accordingly, exceptionally large data files are required for complete picture images.

In full motion video, not only are large blocks of data required to describe each picture image, but a new image or frame must be presented to the viewer at approximately thirty new images per second to create the illusion of motion. Moving these large streams of video data across digital networks or phone lines is infeasible given currently available bandwidth.

Data compression is a technique for reducing the number of bits required to represent a given image. Data compression techniques utilize either a shorthand notation to signal a repetitive string of bits or omit data bits from the transmitted message. The latter form of compression is called "lossy" compression and capitalizes upon the ability of the human mind to provide the omitted data. In motion video, much of the picture data remains constant from frame to frame. Therefore, the video data may be compressed by first describing a reference frame and describing subsequent frames in terms of the change from the reference frame.

Several international standards for the compression of digital video signals have emerged and more are currently under development. These standards apply to algorithms for the transmission and storage of compressed digital video in a variety of applications, including: video-telephony and tele-conferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H. 120, the CCITT Recommendations H.261 and H.263, and the ISO/IEC MPEG-1, MPEG-2, and MPEG-4 standards. The MPEG algorithms were developed by the Moving Picture Experts Group (MPEG), as part of a joint technical committee of the International Standards Organization (ISO) and the International Electrotechnical Commission (IEC). The MPEG standards describe a compressed representation of video and associated audio signals. The standard specifies the syntax of the compressed bit stream and the method of decoding, but leaves considerable latitude for novelty and variety in the algorithm employed in the encoder.

Motion compensation is commonly utilized by video encoders in signal processing techniques that compress successive frames of digital video data for transmission via a communication medium of limited bandwidth, or for storing in a storage medium having limited storage capacity. Motion compensated video compression systems such as the ISO/ITU standards of MPEG and H.261/3 use block-based motion estimation that compares a given block of one frame to a block of another frame. Blocks are matched by determining a comparison measurement between any given pair of blocks. A comparison measurement corresponds to some form of a degree of "difference" between the two blocks. If the comparison measurement is below a predetermined threshold, the blocks may be considered to be similar enough that a block match is indicated. If so, the block in the previous video frame may be utilized and only a motion vector is required to indicate the new position of the block in the current video frame. Such motion vectors can be represented with fewer bits than the pixels that comprise the block, and fewer bits need to be transmitted (or stored) in order to recreate the block. A compression technique known as transform coding is often used to generate a bitstream to be encoded as further described hereinbelow.

Motion compensation and encoding motion compensated video are of the most computationally intensive tasks that a video encoder performs. The objective of the encoder is to produce an encoded image represented in a bitstream that provides the best visual quality for the rate of data transfer, also referred to as bit-rate, allowed by the video coding standards.

SUMMARY OF THE INVENTION

In one embodiment, a method for optimizing the video encoding process for a macroblock in a block-based video encoder is provided wherein a plurality of candidate motion and mode vectors, [mode information related to each of the motion vectors] and quantized discrete cosine transform coefficients based on the macroblock and the candidate motion vectors are provided. The method includes (a) determining the length of a bitstream based on quantized discrete cosine transform coefficients, the motion vectors, and the mode vectors;

(b) generating a bit-rate term based on the length of the bit stream;

(c) determining a measure of distortion based on compressing the macroblock;

(d) determining a rate-constrained distortion signal based on the block distortion and the bit-rate term;

(e) repeating (a) through (d) for each candidate motion vector and mode vector; and (f) selecting the motion vector and corresponding mode vector which minimizes the overall rate-constrained distortion.

A Lagrange multiplier may be used to determine the bit-rate term in (b). The bit stream associated with the selected motion vector and corresponding mode vector includes the quantized discrete cosine transform coefficients, the motion vectors, and the mode vector encoded in a compressed format. The bit stream is output to an output buffer. The motion estimation signal may also be based on the measure of distortion, the bit-rate term, and the quantization parameter. Further, selected processes in the method may be executed in parallel to decrease time delay.

In another embodiment, an apparatus for optimal video encoding that includes selection of a motion vector and corresponding mode vector, and a quantization scale factor, for a current macro-block in a block based video encoder is provided wherein a plurality of candidate motion vectors and corresponding mode vectors, and quantized discrete cosine transform coefficients based on the macroblock and the candidate motion vectors and mode vectors are provided. The apparatus includes a video encoder preprocessor connected to receive the quantized discrete cosine transform coefficients, the candidate motion vectors, and the candidate mode vectors, the video encoder preprocessor being operable to determine the length of a bit stream required to encode each candidate motion vector, corresponding mode vector, and corresponding quantized discrete cosine transform coefficients, and to transmit the length of the bit stream;

a Lagrange multiplier unit connected to receive the length of the bit stream, the Lagrange multiplier unit being operable to generate a bit-rate term based on the length of the bit stream, and to transmit the bit-rate term;

an inverse quantization unit connected to receive the discrete cosine transform coefficients, the inverse quantization unit being operable to determine inverse quantized discrete cosine transform coefficients and to transmit the inverse quantized discrete cosine transform coefficients; and a distortion calculator unit connected to receive the inverse quantized discrete cosine transform coefficients, the distortion calculator unit being operable to generate a distortion signal.

The apparatus is further operable to determine a measure of distortion based on the distortion signal and to determine a motion estimation signal based on the measure of distortion and the bit-rate term for each candidate motion vector and corresponding mode vector, and to select the motion vector having the minimum motion estimation signal, and to select a quantization scale factor based on the measure of distortion and the bit-rate term. The selected motion vector and corresponding mode vector is output to a buffer for transmission to a video encoder.

Advantageously, the present invention generates an estimate of the bit-rate term without requiring each candidate motion vector and corresponding mode vector to be encoded.

BRIEF DESCRIPTION OF THE DRAWINGS

The video encoder preprocessor may be better understood, and its numerous objects, features, and advantages made apparent to those skilled in the art by referencing the accompanying drawings.

The use of the same reference symbols in different drawings indicates similar or identical items.

DETAILED DESCRIPTION

As the present invention may be applied in connection with an encoder meeting the industry standards, some pertinent aspects of standard compression algorithms will be reviewed. It is to be noted that the invention can be applied to video coding algorithms which share some of the following features.

It will be understood that the compression of any data object, such as a page of text, an image, a segment of speech, or a video sequence, can be broken into a series of steps, including 1) decomposing the object into a collection of tokens; 2) representing the tokens by binary strings which have minimal length in some sense; and 3) concatenating the strings in a well-defined order. Steps 2 and 3 are lossless, i.e., the original data is faithfully recoverable upon reversal. Step 1 can be either lossless or lossy in general. Most video compression schemes are lossy because of stringent bit-rate requirements. A successful lossy compression algorithm eliminates redundant and irrelevant information, allowing relatively large errors where they are not likely to be visually significant and carefully representing aspects of a sequence to which the human is observer is very sensitive.

An image, also referred to as a picture, can be either field-structured or frame-structured A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a group of pictures, three types of pictures can appear. The distinguishing difference among the picture types is the compression method used. The first type, Intra mode pictures or I-pictures, are compressed independently of any other picture. Although there are no requirements for how frequently an I-picture must be interspersed among the other types of pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures that will be displayed in the future. Because reconstructed I or P pictures can be used to reconstruct other pictures, they are called anchor pictures. Additionally, P and B pictures are referred to as Inter mode pictures because they rely on information from previous and/or future pictures.

The type of a picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used. The combination of macroblock mode and motion compensation mode used by a macroblock is referred to as the motion compensation method, including the following such methods: F/S, B/S, FB/S, F/E, B/E, FB/E, and F/D. These methods generate predictive macroblocks based on the picture in one or more previous frames or future frames along with information on which fields in the previous or future frames to use to regenerate the image at a new location.

The vectors sent for any mode of motion compensation can be in half-pixel (half-pel) units. In the case of the F/S, F/E, B/S and B/E methods of motion compensation, spatial interpolation is used to generate the predictive macroblock when the vectors used are in half-pel units. In the case of the FB/S, FB/E, and F/D methods, spatial interpolation is used to generate the macroblocks that are averaged to make the predictive macroblock when the vectors used are in half-pel units.

A common compression technique is transform coding. In several of the compression standards, the discrete cosine transform (DCT) is the transform of choice. The compression of an I-picture is achieved by the steps of 1) taking the DCT of blocks of pixels, 2) quantizing the DCT coefficients, and 3) entropy coding the result. The DCT operation converts a block of nxn pixels into an nxn set of transform coefficients. The DCT transformation by itself is a lossless operation.

The second step, quantization of the DCT coefficients, is the primary source of lossiness. Denoting the elements of the two-dimensional array of DCT coefficients by $c_{mn}$, where m and n can range from 0 to 7, aside from truncation or rounding corrections, quantization is achieved by dividing each DCT coefficient $c_{mn}$ by $w_{mn}$ times $Q_p$, with $w_{mn}$ being a weighting factor and $Q_p$ being the quantizer parameter. The weighting factor $w_{mn}$ allows coarser quantization to be applied to the less visually significant coefficients. The quantizer parameter $Q_p$ is the primary means of trading off quality vs. bit-rate. $Q_p$ can vary from macroblock to macroblock within a picture.

The entropy of an encoder is the average information generated by the encoder, typically expressed in bits per message. The representation of messages by binary strings having minimal length in some sense is known as entropy coding, which is the third step. The video coding standards often impose restrictions on the range of motion vectors and define the use of particular variable length code tables for final entropy coding of the quantized DCT coefficients, motion vectors, and mode information vectors.

Figure 1:
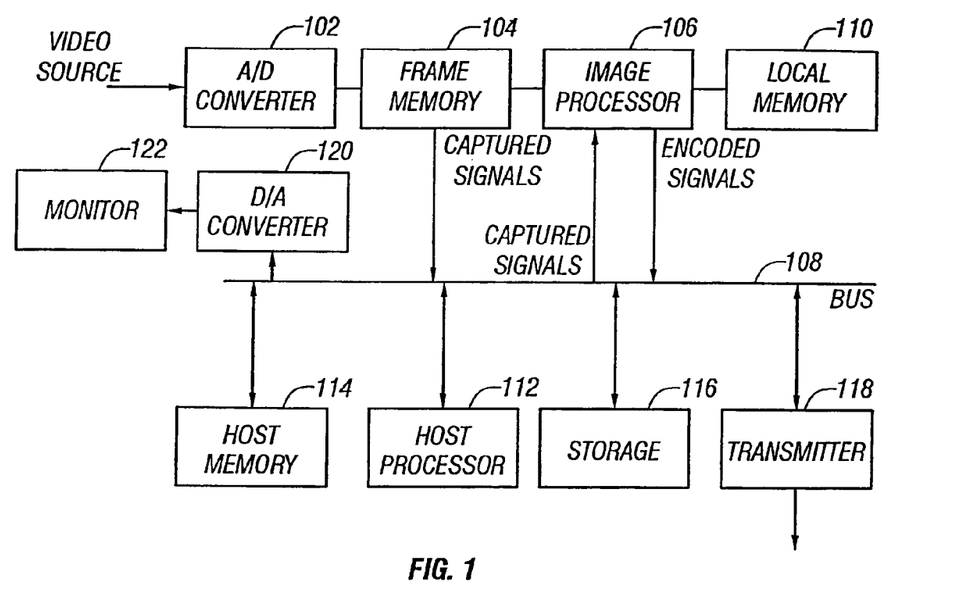
FIG. 1 is a block diagram of a processing system for a video encoder.

FIG. 1 shows a computer-based encoding system 100 for encoding video image signals within which the present invention may be utilized. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals.

Frame memory 104 receives and stores the digitized component signals as subsampled video images. Image processor 106 accesses captured bitmaps from frame memory 104 via bus 108 and generates encoded image signals that represent one or more of the captured video images. Depending upon the particular encoding method implemented, image processor 106 applies a sequence of compression techniques to reduce the amount of data used to represent the information in each image. The compression method of motion estimation in accordance with the present invention will be further described below. Pixel data, along with other information required by image processor 106 may be stored in local memory device 110. The encoded image is transmitted to host processor 112 via bus 108 for storage in host memory 114 and/or in storage 116. Those skilled in the art will recognize that host processor 112 may in alternative embodiments perform the functions of image processor 106 described herein. Similarly, a general memory device such as host memory 114 or storage 116 may perform the functions of local memory 110 described herein. Host processor 112 may transmit the encoded image to transmitter 118 for transmission to a remote receiver (not shown in FIG. 1), store the encoded image to storage 116 for future processing, or both. In addition, digital-to-analog converter 120 may receive and convert digital image signals to analog image signals for display in one or more windows on monitor 122.

Encoding system 100 is preferably a general microprocessor-based computer system with a special purpose video-processing plug-in board. In particular, A/D convertor 102 may be any suitable means for decoding and digitizing analog video image signals. Image processor 106 may be any suitable processor or other means for receiving digitized video image component signals as subsampled frames, and for encoding subsampled video image signals, where the processor or other means is capable of implementing functions such as a forward discrete cosine transform and a motion estimation and block matching procedures as described in further detail below. Memory devices 110, 114 may be any suitable computer memory device such as a dynamic random access memory (DRAM) device, read-only memory device (ROM), or a combination of DRAM and ROM. Storage device 116 may be any suitable means for storing digital signals such as a computer hard drive. Bus 108 may be any suitable digital signal transfer device such as an Industry Standard Architecture (ISA) bus, and Extended ISA (EISA) bus, or a Peripheral Component Interface (PCI) bus. A/D converter 102, frame memory 104, image processor 106, and local memory 110 may be contained on a single plug-in board capable of being interfaced with bus 108. Host processor 112 may be any suitable means for controlling the operations of the image processor 106, such as a microprocessor. Transmitter 118 may be any suitable means for transmitting digital signals to a remote receiver and is operable to transmit digital signals over telephone lines, RF antenna, local area network, or remote area network. D/A converter 120 may be any suitable device for converting digital image signals to analog image signals and may be implemented through a display system, such as a VGA or SVGA system. Monitor 122 may be any means for displaying analog image signals, such as a VGA monitor.

The encoding system 100 discussed herein is representative of a typical encoding system, however, it is recognized that the present invention is also applicable to encoding systems having different components and interrelation among the components.

Figure 2:
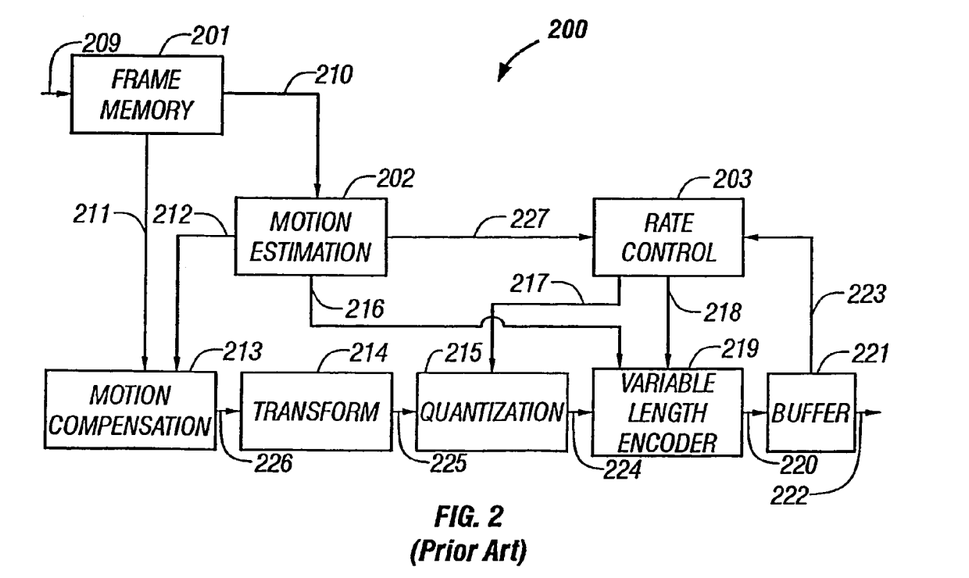
FIG. 2 is a block diagram of a video encoder in the prior art.

FIG. 2 is a block diagram of a simplified view of a video encoder 200 currently known in the art including frame memory 201, motion estimation unit 202, rate control unit 203, motion compensation unit 213, transform unit 214, quantization unit 215, variable length encoder unit 219, and output buffer 221. The input to the video encoder of FIG. 2 is signal 209. The output is compressed bit stream 222. For the encoder of FIG. 2, the input pixel data is stored in frame memory 201. Motion estimation unit 202 performs motion estimation for each macroblock. In particular, for each macroblock motion estimation unit 202 decides which macroblock mode and which motion compensation mode will be used, which motion vector(s) will be used, and an estimate of how precise the effective motion compensation is (that is, how well the predictive macroblock matches the macroblock to be encoded.) This estimate and the mode and vector decisions are then sent to rate control unit 203 as signal 227. It is the function of rate control unit 203 to determine the value of $Q_p$ to be used in each macroblock. This determination is made based on the information from the motion estimation unit (signal 227) and the fullness of the output buffer (signal 223).

Motion estimation unit 202 sends the macroblock mode, motion compensation mode and motion vector(s) as signal 212 to motion compensation unit 213. This signal, together with pixel data retrieved from frame memory 201 as signal 211 is used by compensation unit 213 to compute a difference macroblock, which is sent as signal 226 to transform unit 214. The transform unit 214 segments the difference macroblock (signal 226) into blocks and computes the DCT of each block. These are sent as signal 225 to the quantization unit 215. The quantization unit 215 quantizes each DCT coefficient based on the quantization parameter $Q_p$, sent as signal 217 from rate control unit 203. The quantized DCT coefficients are sent as the signal 224 to variable length encoder unit 219.

For each macroblock, variable length encoder unit 219 produces a compressed representation of the quantized DCT coefficients (signal 224 from quantization unit 215), the macroblock mode, motion compensation mode and motion vectors (signal 216 from motion estimation unit 202), and $Q_p$ (signal 218 from rate control unit 203).

The compressed macroblock is sent as signal 220 to output buffer 221. Output buffer 221 receives the compressed representation of each macroblock from variable length encoder unit 219 as signal 220. It then sends out the bits that it has received on a first come, first serve basis as signal 222. A signal indicating the fullness of the output buffer is sent as signal 223 to rate control unit 203. Rate control unit 203 will in general respectively increase or decrease the value of $Q_p$ for future macroblocks if the output buffer 221 is respectively nearly full or nearly empty).

Block-based motion estimation 202 traditionally considers only the sum of the absolute differences (SAD) between the current and the reference blocks to find the motion vectors, while ignoring the effects of the quantization 215 and the fixed variable length coding tables in variable length encoder unit 219. Mathematically, the problem may be formulated as follows. Let $X_k$ be the current macroblock to be coded.

Let $\hat{X}_{k|i,j}$, with j being the index of the reference frame, be the prediction made by the motion estimation algorithm by using a motion vector, $mv_i$ in the search window W. The displaced frame difference representing the prediction error is given by $$q_{k,i} = X_k - \hat{X}_{k|i,j}.$$

Let D be the distortion measure used (sum of absolute differences or squared error). A distortion given by $D(q_{k,i}) = D(X_k - \hat{X}_{k|i,j})$ is introduced because of choosing the motion vector $mv_j$. Motion estimation 202 chooses the motion vector in the search window W which minimizes this distortion. That is $$D_k = \min_{mv_i \in W} \{D(X_k - \hat{X}_{k|i,j})\}$$

The displaced frame differences (DFD's) associated with this choice of the motion vector $mv_{min}$ generated in motion compensation 213 by $$q_k = X_k - \hat{X}_{k|min,j}.$$

The DFD's are then transformed using 8×8 discrete cosine transform (DCT) ($Q_k$) in transform 214 and quantized ($\hat{Q}_k$) using the quantization parameter $Q_p$ in quantization 215.

Since the variable length code tables in variable length encoder unit 219 for motion vectors are predefined by the standards based on several types of image sequences, the motion vector selected using the least sum of absolute differences criterion may not be the optimal choice. This is particularly important in low bit-rate video coding, where mode information vectors contain a proportionately higher amount of information. Hence, some known methods include the bits required for mode information vectors in the minimization criteria. The optimization is performed using known Lagrange multiplier techniques.

The present invention further extends the Lagrange multiplier technique to improve motion estimation and the video encoding process. When the quantizer value for the current macroblock is known, the number of bits needed to code the quantized DCT coefficients can be included. Further, when such computations are performed, it is also possible to obtain the true distortion representing the quantization effects rather than the sum of absolute differences or mean squared error between the uncoded and the predicted macroblocks to be included in the objective function.

In the present invention, the block matching procedures between the current macroblock and the search area are used to find the appropriate motion vectors. The search area is defined by the range of the motion vectors permitted by the coding standard. In prior methods, the sum of absolute differences is used as a distortion measure and the motion vectors are chosen to minimize the prediction error, i.e., the differences between the current macroblock and the reference macroblock. However, the present video encoder also minimizes the overall distortion between the original and the reconstructed macroblock for the available bit-rate, thereby minimizing the overall encoding distortion and not just the prediction error.

Let $B_k$ be the total number of bits it would take to code ($\hat{Q}_k$) using the variable length code tables defined by the video coding algorithm along with the mode information vector of $S_k$ bits (for coding the differential motion vectors, mode information, etc.). A decoder receives $B_k$ bits from the bitstream and reconstructs the quantized transform coefficients along with the motion vectors. The motion vectors are then used to get the macroblock prediction $\hat{X}_{k|min,j}$ from the reference frame j. The quantized transformed coefficients are inverse quantized using $Q_p$ which is also sent as a part of the mode information vector $S_k$ and then inverse transformed using an 8×8 inverse DCT to obtain $\hat{q}_k$. The macroblock is finally reconstructed by adding the quantized DFD to the prediction. That is:

$$\hat{X}_k = \hat{X}_{k|min,j} + \hat{q}_k.$$

The distortion between the original macroblock $X_k$ and the reconstructed macroblock $\hat{X}_k$ is given by $$D(X_k - \hat{X}_k) = D(q_k - \hat{q}_k).$$

From the above equation, the final reconstruction error is a function of both the prediction and the quantization process. In the present invention, the motion vectors are chosen to minimize the overall coding distortion and not just the average prediction error.

Given the quantization scheme and the bit stream syntax, the only search parameters which can be used to minimize the overall distortion between the current and the reconstructed macroblock are the motion vectors and mode information vectors. Mode vectors include information pertaining to each macroblock including quantization parameter $Q_p$, macroblock address, macroblock type (intra/inter), motion type (frame/field/overlapped motion), DCT type (frame/field), coded block pattern to indicate which blocks in a macroblock have non-zero DCT coefficients, and quantization scale factor. In addition, most video coding systems have a constraint on the average bit-rate. In practice, for the given maximum frame rate, this constraint on the bit-rate can be suitably changed to a target number of bits for the current picture. An appropriate rate control scheme can transform it to the average bits/macroblock. Let B be the average target bit-rate/macroblock. One goal of the present video coding algorithm is to find the motion vector and corresponding mode vector to minimize the distortion between the original and the reconstructed macroblock with the contrstraint that the number of bits to encode a macroblock is less than or equal to the average bit rate. That is:

$$\min_{mv_i \in W, moj \in M} \{D(X_k - \hat{X}_k)\} \text{ subject to } B_k \leq B.$$

Where moj denotes a candidate mode vector and M denotes the mode vector search window.

Most rate allocation algorithms tend to vary $Q_p$ only once per row of macroblocks or even once a picture. Assuming that $Q_p$ is a constant for the whole frame, the unconstrained motion estimation problem can then be stated as:

$$\min_{mv_i \in W, moj \in M} \{D(X_k - \hat{X}_k)\}$$

Note that $Q_p$ need not be constant over a frame.

The above unconstrained motion estimation problem can then be converted to a constrained motion estimation problem by using known Lagrange multiplier techniques. The problem can then be stated as:

$$\min_{mv_i \in W, moj \in M} \{D(X_k - \hat{X}_k) + \lambda * (B_{k,i} - B)\}$$

where $\lambda$ is a constant for a given bit-rate. Since B is a constant, the problem of the rate-constrained motion estimation algorithm, given $Q_p$ and $\lambda$, is to find the motion vector in the search window W which minimizes the modified distortion $$D'((X_k - \hat{X}_k) = D(X_k - \hat{X}_k) + \lambda * B_{k,i} \quad \text{(Equation 1)}$$

Figure 3:
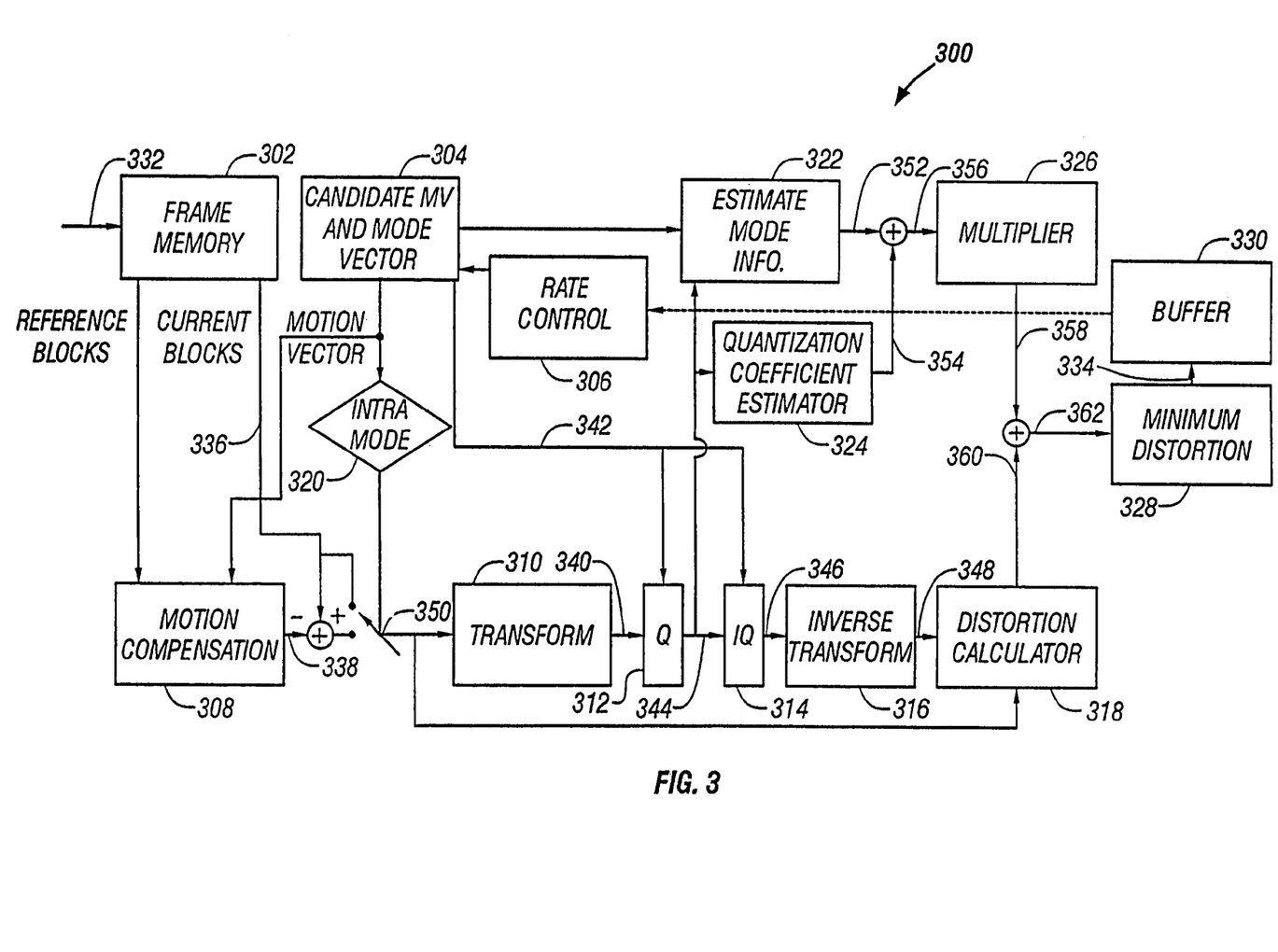
FIG. 3 is a block diagram of a video encoder preprocessor according to the present invention.

FIG. 3 shows a block diagram of an embodiment of the present invention for a video encoder preprocessor 300 including frame memory 302, candidate motion vector and mode information vector unit 304, rate control unit 306, motion compensation unit 308, transform unit 310, quantization unit 312, inverse quantization unit 314, inverse transform unit 316, distortion calculator unit 318, intramode switch 320, mode information estimator unit 322, quantization coefficient estimator unit 324, multiplier unit 326, minimum distortion unit 328, and buffer 330. The input to video encoder preprocessor 300 of FIG. 3 is pixel data signal 332. The output is compressed bitstream signal 334 which is stored in output buffer 330 pending transmission to a decoder. Input pixel data signals 332 are stored in frame memory 302. For each macroblock, candidate motion vectors and corresponding mode information vectors are generated for encoder preprocessing, which evaluates the cost for each candidate in terms of distortion rate and bit rate, and selects the candidate with the minimum cost. The selected candidate is then output to buffer 330 pending transmission to a video encoder (not shown) for encoding.

Depending on whether the mode is Intra or Inter mode, the macroblock is processed differently as follows. For Intra mode, current macroblock signal 336 is sent directly to transform unit 310. For Inter mode, motion compensation unit 308 computes a prediction signal 338 for the current block using reference blocks from frame memory 302. A displaced frame difference (DFD) signal based on the difference between prediction signal 338 and current macroblock signal 336 is sent as block signal 350 to transform unit 310. Transform unit 310 segments block signal 350 into blocks and computes the DCT of each block. The DCT's of each block are output as transform signal 340.

Rate control unit 306 determines the value of $Q_p$ to be used in each macroblock. In the present invention, this determination may be selected before the motion estimation for the macroblock begins using known techniques when $Q_p$ is selected based on the fullness of output buffer 328. Such techniques are discussed in "*Motion Compensated Video Coding with Adaptive Perceptual Quantization*," by A. Puri and R. Aravind, IEEE Transactions on Circuits and Systems on Video Technology, vol. CSVT-1, no. 4, pp. 351–361, December 1991.

Transform signal 340 and mode information vector signal 342 are sent to quantization unit 312 for quantization. Additionally, mode information and quantization parameter $Q_p$ are input to quantization unit 312 and inverse quantization unit 314. Quantization unit 312 quantizes each DCT coefficient based on the quantization parameter $Q_p$ and generates quantization signal 344, which is then input to mode information estimator unit 322, quantization coefficient estimator unit 324, and inverse transform unit 314.

Mode information estimator unit 322 estimates the bits required to encode the motion vectors and other mode information, and determines whether any of the blocks in a macroblock need to be coded. Mode information estimator unit 322 determines how this information is to be sent in bitstream signal 334 based on the motion vector prediction scheme employed in the relevant video coding standard. It is important to note that only an estimate of the number of bits required to encode all the mode information is needed and not the actual number of bits.

Quantization coefficient estimator unit 324 estimates the number of bits required to encode the quantized transform coefficients based on quantization signal 344. Any suitable scheme may be utilized to predict the number of bits required to encode the quantized coefficients based on the variable length code tables in the relevant coding standard. Actually counting the number of bits required to represent the quantized blocks provides the most accurate value of the number of bits required to encode the quantized coefficients.

The quantized coefficients (quantization signal 344) and mode information vector signal 342 are input to inverse quantization unit 314. Inverse quantization signal 346 is input to inverse transform unit 316. Inverse transform signal 348 and block signal 350 are input to distortion calculator unit 318 wherein the distortion between block signal 350 and inverse transform signal 348, which represents the reconstructed data, is determined. Any distortion measure which indicates the difference between the signals, such as mean squared error, can be utilized.

Signals 352 output from mode information estimator unit 322 and signal 354 output from quantization coefficient estimator unit 324 are summed and input as bit length signal 356 to multiplier unit 326. A multiplier, such as Lagrange multiplier, λ, is applied to bit length signal 356 to generate bit-rate signal 358 proportional to the bit-rate for the macroblock given the candidate motion vector and mode information vector.

Bit-rate signal 358 and distortion signal 360 are summed to form motion estimation signal 362 according to Equation 1 hereinabove. Each candidate motion vector and mode information vector is preprocessed in video encoder preprocessor 300. Minimun distortion unit 328 determines the combination of motion vector and mode information vector which minimizes the motion estimation signal 362. The minimizing combination is sent as bitstream signal 334 to buffer 330. The data in buffer 330 is output to an encoder unit (not shown) for encoding.

Figure 4:
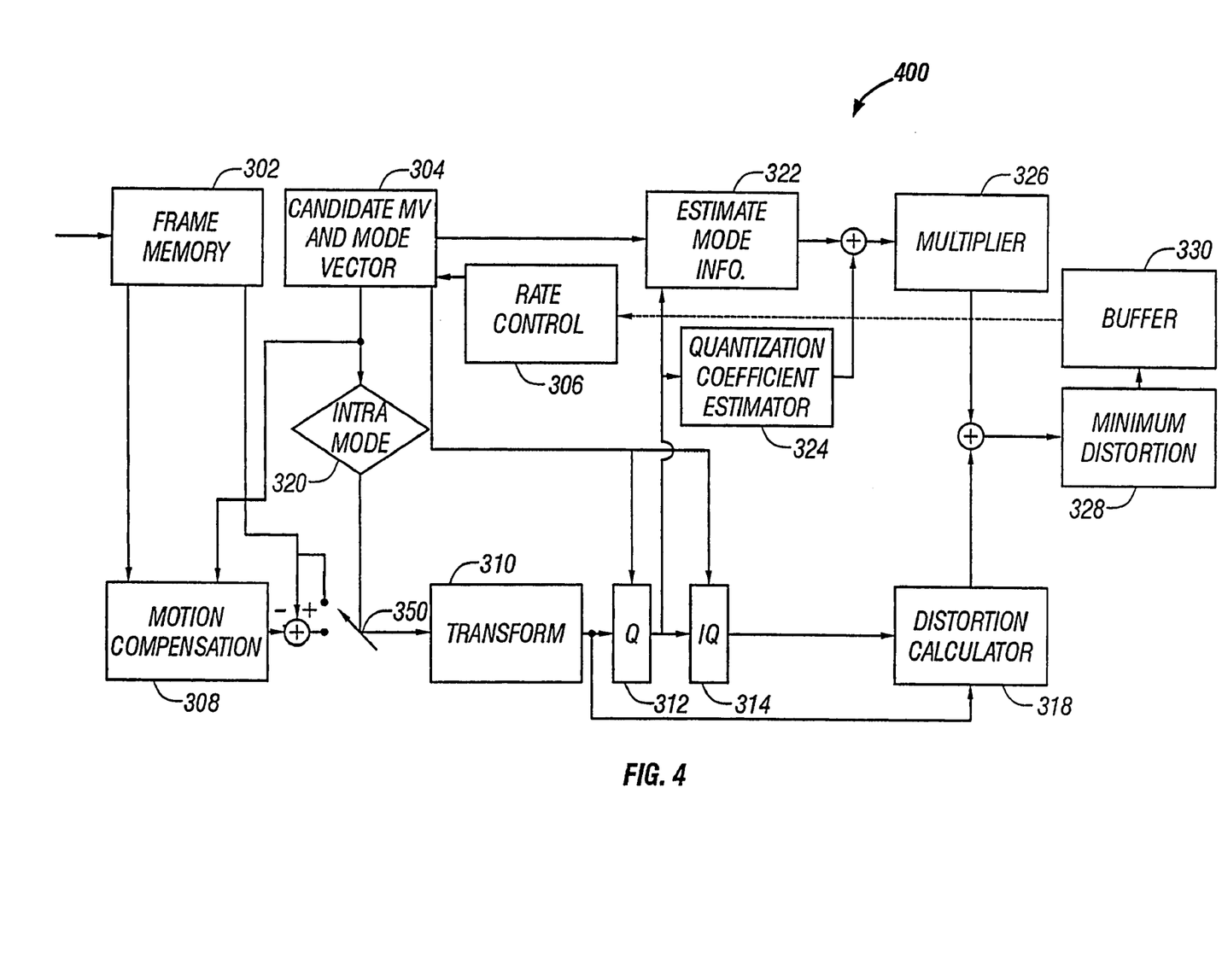
FIG. 4 is a block diagram of another video encoder preprocessor according to the present invention.

FIG. 4 shows another embodiment of a video encoder preprocessor 400 which is similar to video encoder preprocessor 300 with the exception that distortions introduced by the quantization unit 312 are calculated in transform unit 310, thereby eliminating the need for inverse transform unit 316. Note also that mode information estimator unit 322 and quantization coefficient estimator unit 324 may be combined in one estimate unit.

The present invention can also be used for rate control using the quantization parameter $Q_p$. This is achieved by performing the minimization of the objective function over all candidate quantization parameter ($Q_p$) values with the additional constraint of the allowable number of bits.

$$\min_{mv_i \in W, Q_p} \{D(X_k - \hat{X}_k)\}$$

subject to $B_k \leq B$. This is especially useful when $Q_p$ varies more than once per row of macroblocks or even more than once per frame.

Advantageously, the present invention provides a video encoder preprocessor that takes into account both distortion and the amount of data required for a candidate motion vector and mode information vector in determining the optimal combination to be processed by the actual video encoder. Traditional schemes were limited to considering the motion estimation and the quantization process separately, leading to sub-optimal results in many situations. For example, choosing the motion vector which minimizes the sum of the absolute differences and the mean squared error is not the optimal choice with regard to rate-distortion, since the number of bits required to encode a DFD is ignored. Further, bits for mode parameters such as motion vectors, coded block pattern, and macroblock type, become a sizable amount of encoded data at low bit-rates, and therefore cannot be ignored for optimal encoding. Additionally, the present invention takes into account whether a macroblock is coded as an Inter or Intra mode. This further optimizes encoding since the determination of whether to use Inter or Intra mode for a macroblock is also based on rate distortion.

Video encoder preprocessor 300 may be implemented in hardware, software, firmware, or a combination of hardware, software and firmware. A known data processor, such as a microprocessor-based computer, as well as other hardware, firmware, and software devices, may be used to implement the present invention. The present invention may be implemented so that various preprocessing units execute in parallel. Additionally, local memory 110 may provide rapid access to the data by placing the search area and the current macroblock pixels in cache memory for quick, repeated access by the processing units in video encoder preprocessor 300. Computer processors with one or more accelerators for motion compensation unit 308 or other processing units in video encoder preprocessor 300 may also be used.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method for optimizing the video encoding process for a macroblock in a block-based video encoder comprising:
   (a) generating an estimated length by estimating a length of a bit stream required to encode a plurality of quantized discrete cosine transform coefficients, a plurality of motion vectors, and mode information, wherein the mode information is related to each of the motion vectors, and the quantized discrete cosine transform coefficients are based on the macroblock and the motion vectors; and
   (b) generating a bit-rate term based on the estimated length.

2. The method of claim 1, further comprising:
   (c) determining a measure of distortion based on the quantized discrete cosine transform coefficients; and
   (d) determining a motion estimation signal based on the measure of distortion and the bit-rate term.

3. The method of claim 2, wherein
   the determining of the motion estimation signal is further based on a quantization parameter, wherein
      the quantization parameter is based on at least one of the motion vectors and the mode information related to the at least one of the motion vectors.

4. The method of claim 2, further comprising:
   (e) repeating (a) through (d) for each of the motion vectors; and
   (f) selecting a one of the motion vectors having the minimum motion estimation signal.

5. The method of claim 4, further comprising:
   (g) outputting the length of the bit stream and information associated with the selected motion vector to an output buffer.

6. The method of claim 1, wherein (b) further comprises using a Lagrange multiplier to determine the bit-rate term.

7. The method of claim 1, wherein (a) further comprises encoding the quantized discrete cosine transform coefficients, the motion vectors, and the mode information in a compressed format.

8. An apparatus for optimizing the video encoding process for a macroblock in a block-based video encoder comprising:
means for generating an estimated length by estimating a length of a bit stream required to encode a plurality of quantized discrete cosine transform coefficients, a plurality of motion vectors, and mode information, wherein
the mode information is related to each of the motion vectors, and
the quantized discrete cosine transform coefficients are based on the macroblock and the motion vectors; and
means for generating a bit-rate term based on the estimated length;
means for determining a measure of distortion based on the quantized discrete cosine transform coefficients; and
means for determining a motion estimation signal based on the measure of distortion and the bit-rate term.

9. The apparatus of claim 8, further comprising:
means for processing each of the motion vectors; and
means for selecting a one of the motion vectors having the minimum motion estimation signal.

10. The apparatus of claim 9, further comprising:
means for outputting the length of the bit stream and information associated with the selected motion vector to an output buffer.

11. The apparatus of claim 9, wherein the means for generating the bit-rate term comprises means for using a Lagrange multiplier to determine the bit-rate term.

12. The apparatus of claim 9, wherein the means for generating the estimated length comprises means for encoding the quantized discrete cosine transform coefficients, the motion vectors, and the mode information in a compressed format.

13. The apparatus of claim 9, wherein the means for determining the motion estimation signal comprises determining a motion estimation signal based on the measure of distortion, the bit-rate term, and a quantization parameter.

14. A computer program product for optimizing the video encoding process for a macroblock in a block-based video encoder, comprising:
a first set of instructions, executable on a computer system, configured to generate an estimated length by estimating a length of a bit stream required to encode a plurality of quantized discrete cosine transform coefficients, a plurality of motion vectors, and mode information, wherein
the mode information is related to each of the motion vectors, and
the quantized discrete cosine transform coefficients are based on the macroblock and the motion vectors; and
a second set of instructions, executable on the computer system, configured to generate a bit-rate term based on the estimated length;
a third set of instructions, executable on the computer system, configured to determine a measure of distortion based on the quantized discrete cosine transform coefficients;
a fourth set of instructions, executable on the computer system, configured to determine a motion estimation signal based on the measure of distortion and the bit-rate term; and
computer readable media, wherein the computer program product is encoded in the computer readable media.

15. The computer program product of claim 14, further comprising:
a fifth set of instructions, executable on the computer system, configured to repeat the first, the second, the third and the fourth set of instructions for each of the motion vectors; and
a sixth set of instructions, executable on the computer system, configured to select a one of the motion vectors having the minimum motion estimation signal.

16. The computer program product of claim 15, further comprising:
a seventh set of instructions, executable on the computer system, configured to output the length of the bit stream and information associated with the selected motion vector to an output buffer.

17. The computer program product of claim 15, wherein the second set of instructions comprises:
a first subset of instructions, executable on the computer system, configured to use a Lagrange multiplier to determine the bit-rate term.

18. The computer program product of claim 15, wherein the first set of instructions comprises:
a first subset of instructions, executable on the computer system, configured to encode the quantized discrete cosine transform coefficients, the motion vectors, and the mode information in a compressed format.

19. The computer program product of claim 15, wherein the fourth set of instructions comprises:
a first subset of instructions, executable on the computer system, configured to determine a motion estimation signal based on the measure of distortion, the bit-rate term, and a quantization parameter.

20. An apparatus for optimally encoding motion compensated video, comprising:
means for generating at least one candidate motion vector;
means for generating mode information related to each candidate motion vector;
means for determining a quantization parameter;
means for determining a displaced frame difference macroblock based on the macroblock and the at least one candidate motion vector;
means for segmenting the displaced frame difference macroblock into blocks and determining a discrete cosine transform coefficient for each block;
means for quantizing each discrete cosine transform coefficient based on the quantization parameter;
means for estimating the length of a bit stream that would be required to encode the quantized discrete cosine transform coefficients, the motion vectors, and the mode information; and
means for generating a bit-rate term based on the length of the bit stream.

21. The apparatus of claim 20, further comprising:
means for determining a reconstructed macroblock based on inverse quantization and inverse transformation of the discrete cosine transform coefficients;
means for determining a measure of distortion based on the current macroblock and the reconstructed macroblock; and
means for determining a motion estimation signal based on the measure of distortion and the bit-rate term.

22. The apparatus of claim 20, wherein the means for determining the quantization parameter further comprises determining the quantization parameter based on the length of the bit stream.

23. The apparatus of claim 20, wherein the means for determining the quantization parameter further comprises determining the quantization parameter based on the at least one candidate motion vector and the mode information related to the at least one candidate motion vector.

24. The apparatus of claim 20, wherein the quantization parameter is determined before determining the at least one candidate motion vector and the mode information related to the motion vector.

25. The apparatus of claim 20, wherein the means for generating the bit-rate term further comprises using a Lagrange multiplier to determine the bit-rate term.

26. The apparatus of claim 20, wherein the means for estimating the length of the bit stream further comprises encoding the quantized discrete cosine transform coefficients, the at least one candidate motion vector, and the mode information in a compressed format.

27. The apparatus of claim 20, wherein the means for determining the motion estimation signal further comprises determining the motion estimation signal based on the measure of distortion, the bit-rate term, and the quantization parameter.

28. The apparatus of claim 20, wherein the means for estimating the length of the bit stream and the means for generating the bit-rate term operate in parallel with the means for determining the reconstructed macroblock and the means for determining the measure of distortion.

29. A computer program product for optimally encoding motion compensated video, comprising:
   a first set of instructions, executable on a computer system, configured to generate at least one candidate motion vector;
   a second set of instructions, executable on the computer system, configured to generate mode information related to each candidate motion vector;
   a third set of instructions, executable on the computer system, configured to determine a quantization parameter;
   a fourth set of instructions, executable on the computer system, configured to determine a displaced frame difference macroblock based on the macroblock and the at least one candidate motion vector;
   a fifth set of instructions, executable on the computer system, configured to segment the displaced frame difference macroblock into blocks and determining a discrete cosine transform coefficient for each block;
   a sixth set of instructions, executable on the computer system, configured to quantize each discrete cosine transform coefficient based on the quantization parameter;
   a seventh set of instructions, executable on the computer system, configured to estimate the length of a bit stream that would be required to encode the quantized discrete cosine transform coefficients, the motion vectors, and the mode information;
   an eighth set of instructions, executable on the computer system, configured to generate a bit-rate term based on the length of the bit stream; and
   computer readable media, wherein the computer program product is encoded in the computer readable media.

30. The computer program product of claim 29, further comprising:
   a ninth set of instructions, executable on the computer system, configured to determine a reconstructed macroblock based on inverse quantization and inverse transformation of the discrete cosine transform coefficients;
   a tenth set of instructions, executable on the computer system, configured to determine a measure of distortion based on the current macroblock and the reconstructed macroblock; and
   a eleventh set of instructions, executable on the computer system, configured to determine a motion estimation signal based on the measure of distortion and the bit-rate term.

31. The computer program product of claim 30, further comprising:
   a twelfth set of instructions, executable on the computer system, configured to repeat the first through the eleventh sets of instructions for each candidate motion vector; and
   an thirteenth set of instructions, executable on the computer system, configured to select the candidate motion vector having the minimum motion estimation signal.

32. The computer program product of claim 31, wherein the third set of instructions comprises:
   a first subset of instructions, executable on the computer system, configured to determine the quantization parameter based on the length of the bit stream.

33. The computer program product of claim 31, wherein the third set of instructions comprises:
   a first subset of instructions, executable on the computer system, configured to determine the quantization parameter based on the at least one candidate motion vector and the mode information related to the at least one candidate motion vector.

34. The computer program product of claim 31, wherein the quantization parameter is determined before determining the at least one candidate motion vector and the mode information related to the motion vector.

35. The computer program product of claim 31, wherein the eighth set of instructions comprises:
   a first subset of instructions, executable on the computer system, configured to use a Lagrange multiplier to determine the bit-rate term.

36. The computer program product of claim 31, wherein the seventh set of instructions comprises:
   a first subset of instructions, executable on the computer system, configured to encode the quantized discrete cosine transform coefficients, the at least one candidate motion vector, and the mode information in a compressed format.

37. The computer program product of claim 31, wherein the eleventh set of instructions comprises:
   a first subset of instructions, executable on the computer system, configured to determine the motion estimation signal based on the measure of distortion, the bit-rate term, and the quantization parameter.

38. The computer program product of claim 31, wherein the seventh and the eighth sets of instructions are executed in parallel with the ninth and the tenth sets of instructions.

* * * * *